Oct. 6, 1936.  J. R. PEIRCE  2,056,363
SUBTRACTING TABULATOR
Filed May 2, 1931  7 Sheets-Sheet 1

INVENTOR
J. R. Peirce
BY ATTORNEY
W. M. Wilson

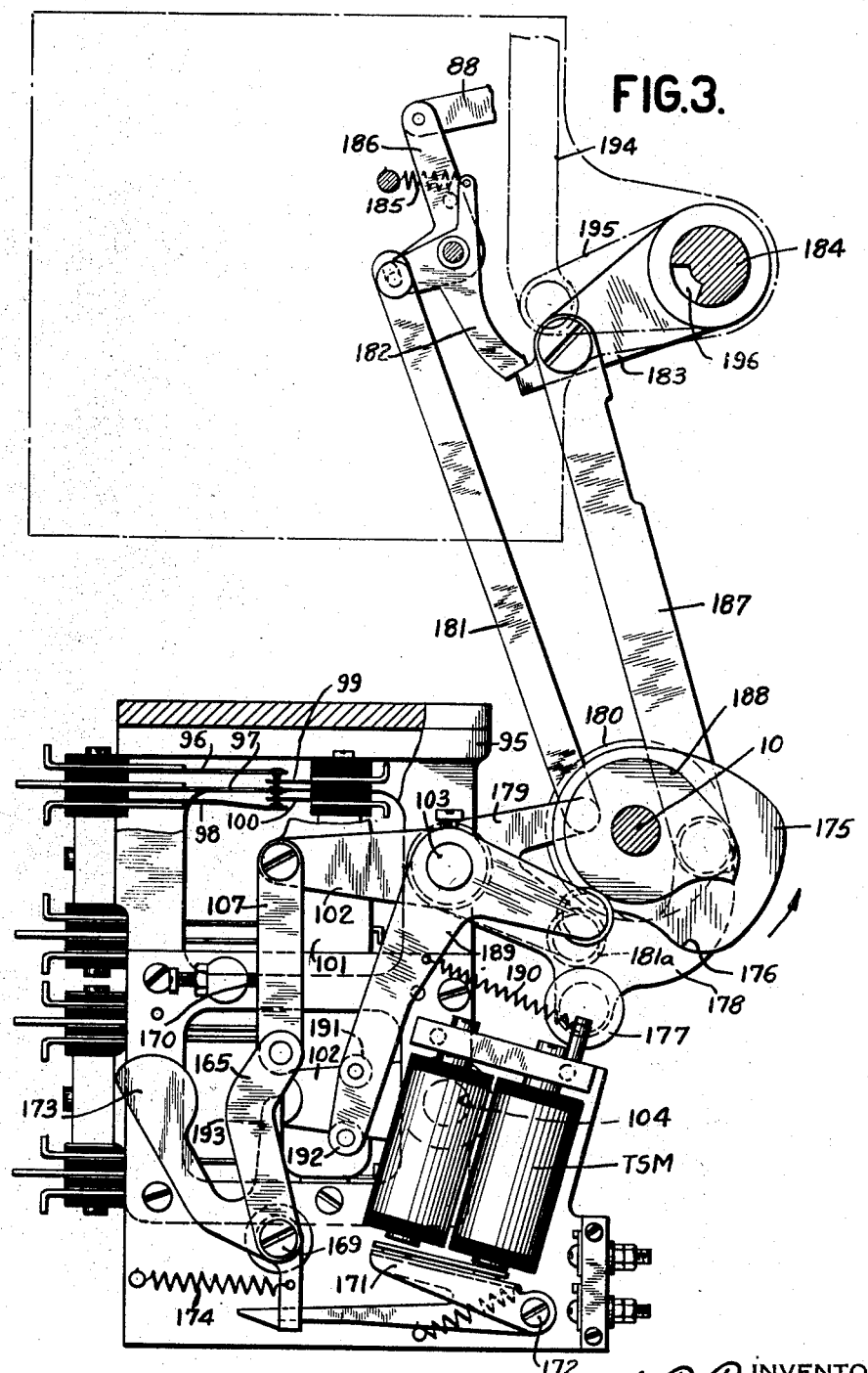

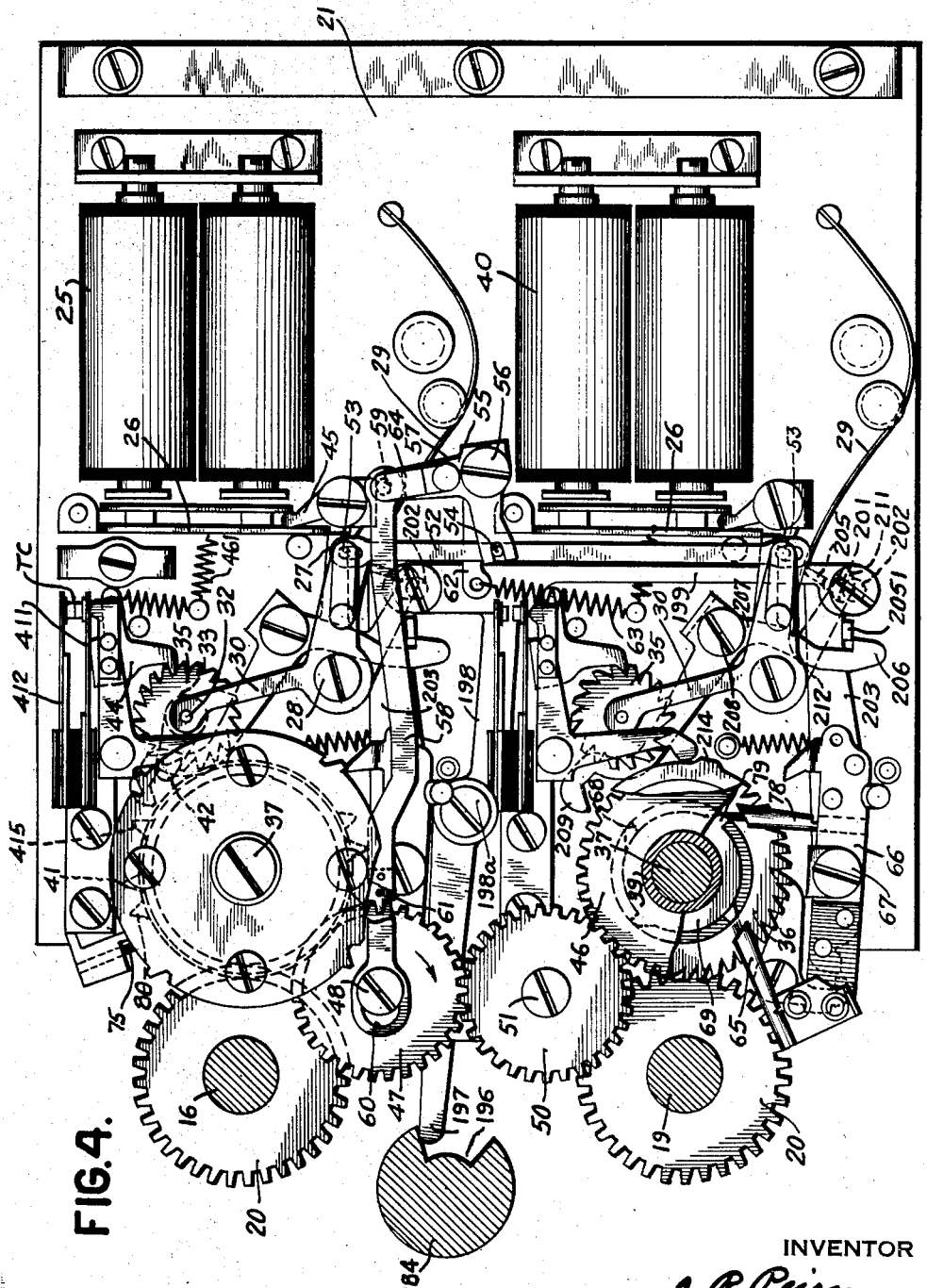

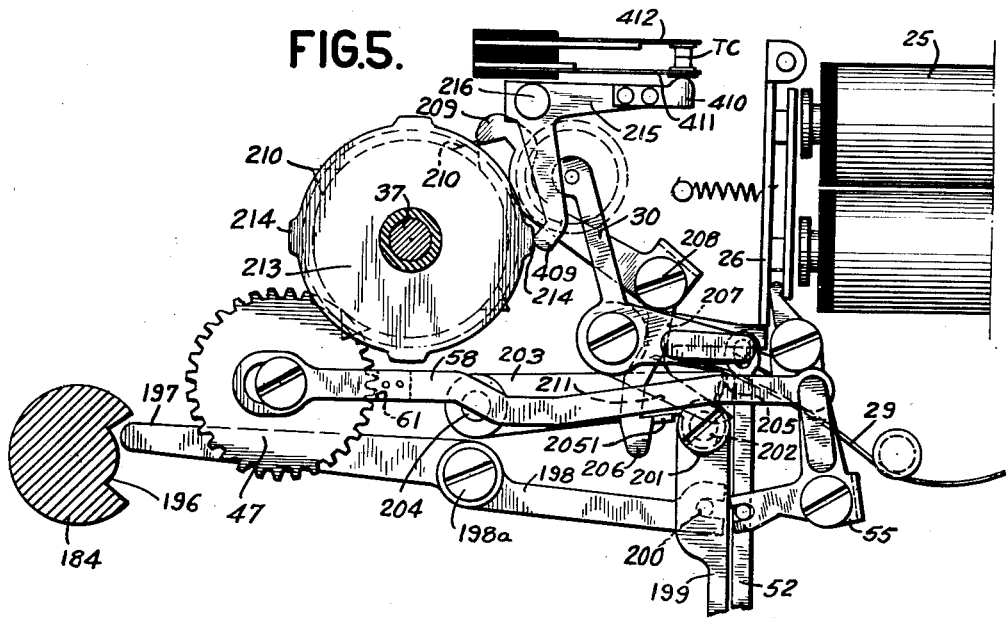

Oct. 6, 1936.   J. R. PEIRCE   2,056,363
SUBTRACTING TABULATOR
Filed May 2, 1931   7 Sheets-Sheet 6
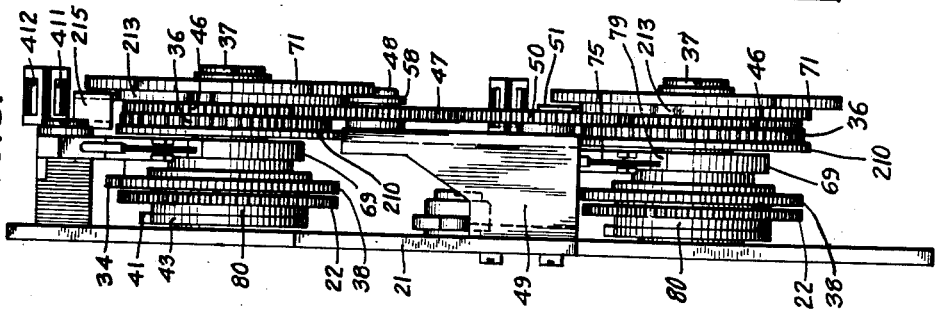
INVENTOR
BY ATTORNEY J. R. Peirce

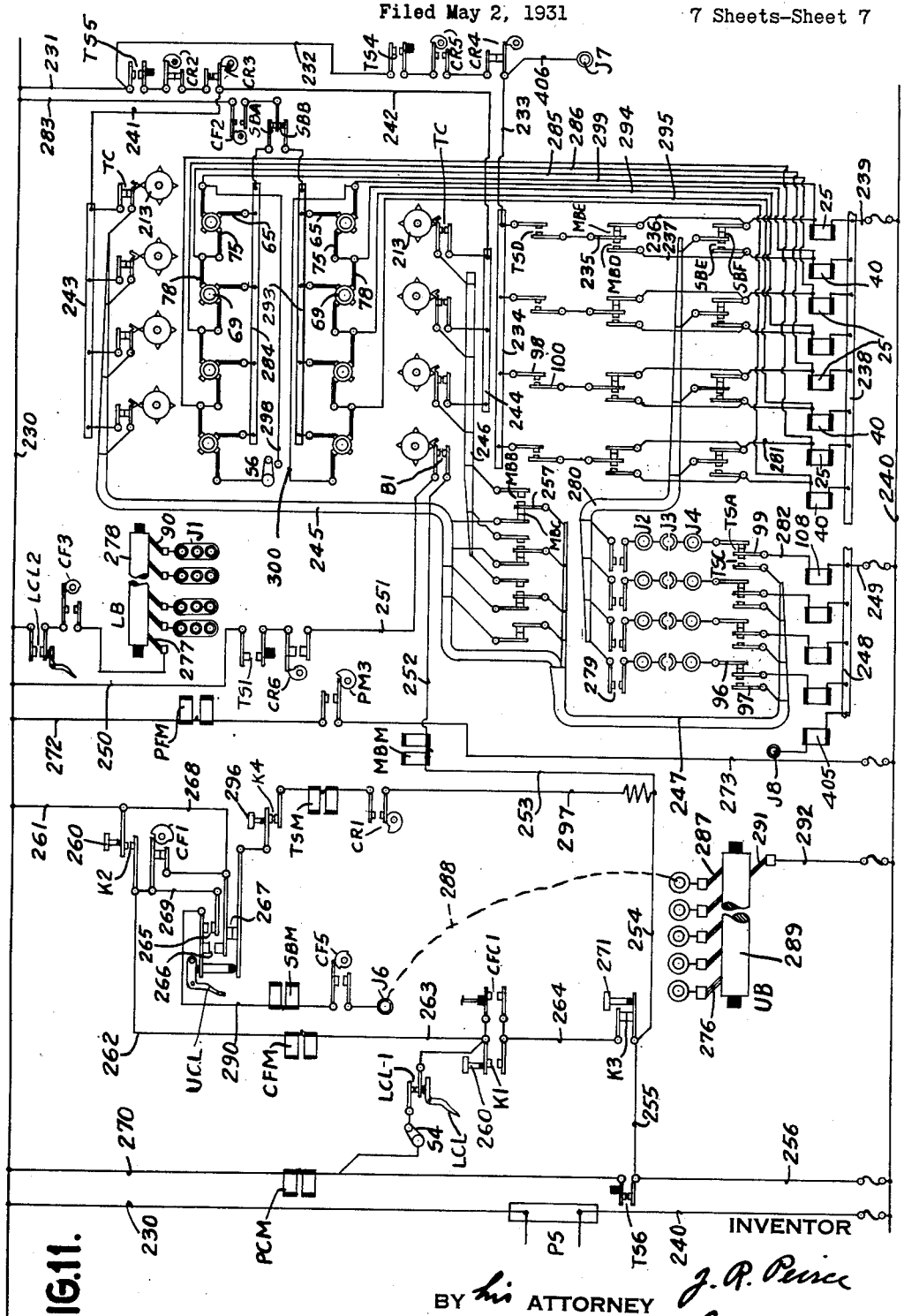

Patented Oct. 6, 1936

2,056,363

UNITED STATES PATENT OFFICE 2,056,363

SUBTRACTING TABULATOR

John Royden Peirce, New York, N. Y., assignor, by mesne assignments, to International Business Machines Corporation, New York, N. Y., a corporation of New York Application May 2, 1931, Serial No. 534,583

12 Claims. (Cl. 235—92)

This invention relates to perforated card controlled accounting machines and more particularly to accumulating devices used in such machines.

In my copending application for patent, Serial No. 442,348, filed April 7, 1930, I disclose a tabulating machine adapted to analyze perforated records as the records are being fed through the machine and to accumulate and list data contained on such record cards and also to print totals of data accumulated from such cards.

In another copending application, Serial No. 426,582, filed February 7, 1930, I disclose a machine with subtracting devices that are adapted to add the true number of credit items and complements of debit items and print the total whether the balance is a positive or a negative amount. The highest order pinion in the accumulator is sensed before totaling to detect the presence of a nine on the pinion. Upon finding a nine the total is read off an auxiliary commutator which holds the complement of the digit values in the accumulator and thus there will be indicated a negative total by a printed true number. If the pinion stands at zero, a positive total is taken under control of the regular accumulating mechanism.

In an application of A. W. Mills, Serial No. 465,540, filed July 3, 1930, there is disclosed a mechanism wherein each one of the debit and credit accumulator orders consists of a pair of accumulating wheels differentially connected so that if one is stopped after rotating a number of steps, the other continues to rotate a number of steps that are the nines complement of the number added to the first wheel. After items have been added in both accumulators a running total is taken of each accumulator. Before the balance total is printed, the number standing on the complemental wheels in the debit accumulator is added to the wheels containing the natural number in the credit accumulator and subtracted from the complement on the other wheels in the credit accumulator.

There will result a natural number on one set of wheels and a complement on the other set of wheels in the credit accumulator. The highest order wheel in the credit accumulator is sensed and if a nine is present on the wheel a debit balance is printed. If the wheel does not stand at nine, a credit balance is printed.

In the present invention I employ an accounting machine similar to that disclosed in the above mentioned applications but I employ a novel type of accumulating mechanism.

An object of the invention is to provide an improved form of subtracting mechanism.

Another object is to devise an accumulating device in which two sets of accumulating wheels are connected by gearing so that they revolve in opposite directions, both sets being thus adapted by addition and subtraction of numbers to arrive at a balance.

Another object is to so construct a subtracting device that a number added to an amount in one accumulator will be subtracted from the complement of the amount in another accumulator.

Another object is to so connect accumulator wheels of related orders in different accumulators so that the entry of a natural or true number additively in either accumulator will effect subtraction in the other.

Another object is to devise a subtracting mechanism wherein one set of accumulator wheels are normally set at zero and serve to add credit items and subtract debit items while another set of accumulator wheels are normally set at nine and are adapted to subtract credit items and add debit items.

Another object is to so connect the two accumulators that the item may be entered into only one accumulator, the other accumulator being adjusted automatically.

Another object is to provide a total printing mechanism which normally prints under control of the credit accumulator but if the total of the amounts subtracted is greater than the total of the amounts added, the difference standing on the accumulators will be registered in the credit accumulator as the complement of a negative amount and indicated by the presence of a nine on the highest order wheel. Then the total printing control is shifted so that a total is printed under control of the debit accumulator which contains a natural number as the negative total or debit balance.

A feature of the present invention is the provision of a pair of accumulating mechanisms each with a separate transfer or carrying mechanism and means for disabling one of the transfer mechanisms while the other is operating.

Another object is to provide a common detenting or aligning device for a duplex accumulating mechanism.

Another object is to provide a total reading device adapted to cooperate with an accumulator wheel which is movable in two directions.

These and other objects will appear in the following description of the invention.

Referring to the drawings wherein I have shown what I now consider to be the preferred form of my invention.

Fig. 3 is a detail of the total control device.

Fig. 4 is a side elevation of one of the duplex accumulator units with portions broken away to more clearly disclose certain parts of the device.

Fig. 5 is a side elevation showing the total reading cam and total contacts.

Fig. 6 is a detail view of the parts used for carrying from one order to the next, the parts being shown in the nine position.

Fig. 7 is another detail view of the carrying mechanism, the parts being shown with the carrying cam in the zero position.

Fig. 8 is a front elevation of the duplex accumulating devices.

Fig. 9 is an illustration of the operation of the machine in adding and substracting credit and debit amounts.

Fig. 10 is an illustration similar to that shown in Fig. 9, the only difference being that the items entered are reversed in sign, the debit items in Fig. 9 being changed to credit items, and the credit items changed to debit items.

Fig. 11 is is a wiring diagram of the operation of the machine showing the control of the accumulators for adding and subtracting and also the control of total printing.

Fig. 12 is an illustration of a sample detail strip showing the listing and totaling of the items used in illustrating the examples given in Figs. 9 and 10.

Described in a general way the illustrative machine is of the type controlled by the well known Hollerith form of perforated card. The card is sensed by the analyzing devices of the machine and the amount represented by the perforations on the card is accumulated and printed. The card is fed through two sets of sensing brushes. The first set of brushes serve to compare the group number of a card with the group number of the card under the other set of brushes and if the numbers do not agree the machine may be stopped or a total may be taken automatically. The first set of brushes also serve to sense the presence of a special perforation present on cards carrying perforations representing a debit item. The second set of brushes serve to control the accumulators and the printing devices.

By the present invention two gear connected sets of accumulator wheels are provided; one set is adapted to receive and add credit items; the other set accumulates debit items. The credit and debit items are distributed under control of the first brushes as mentioned above. While one set of accumulator wheels are adding an amount, the other set of accumulator wheels are being rotated by gearing connecting the two sets in a direction which is the reverse of their normal adding movement, thus subtracting the amount from the number standing on the other wheels. The debit accumulator wheels are all normally set at nine, and as credit items are added on the credit accumulator they are subtracted from the debit wheel thus presenting the nines complement of a credit balance. If the debit items, however, amount to a larger figure than credit items added, a true number representing a debit balance will appear on the debit wheels, while the complement of the balance will appear on the credit wheels. A means is provided for adding one whenever a set of accumulator wheels are rotated from a setting showing a complement to a setting showing a natural number. To do this connections are provided from the highest order wheel to the lowest so that when the nines are cleared out of the wheels by an item, the transfer from the highest order wheel will be transmitted and added to the lowest order wheel. When a totaling operation is initiated, the highest order wheel in the debit accumulator is sensed to determine whether the wheel stands at nine or zero, if the wheels stands at nine a credit balance is printed under control of the credit accumulator, if the wheel stands at zero, the credit accumulator contains the nines complement of the debit balance which is present on the debit accumulator wheels as a true number, therefore control is exercised to print the total from the debit accumulator which holds the balance as a result of the machine having handled debit entries that totaled a larger amount than the credit entries.

*The main drive*

Figure 1:
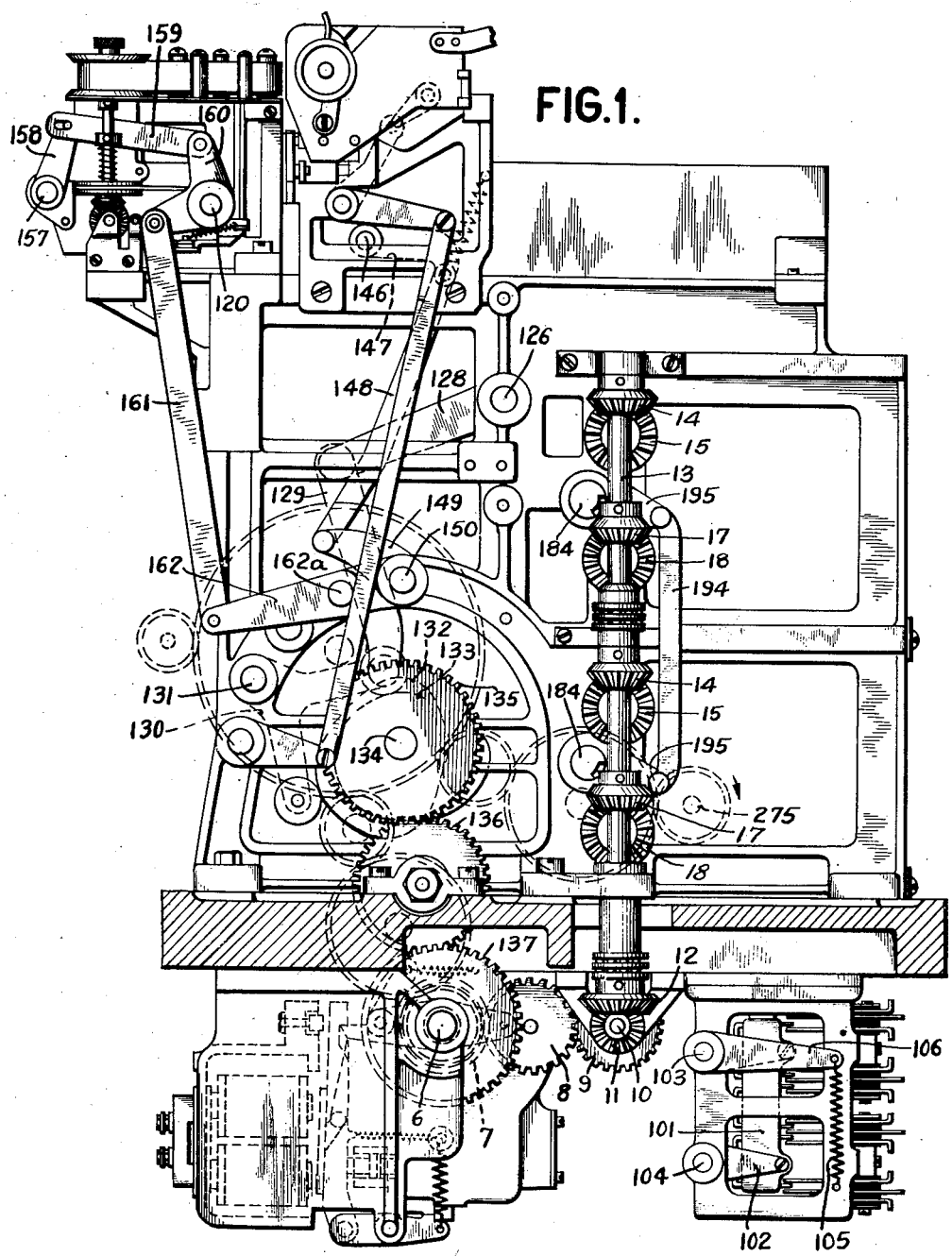
Fig. 1 is a side view partly in section of the machine embodying my invention.
Figure 2:
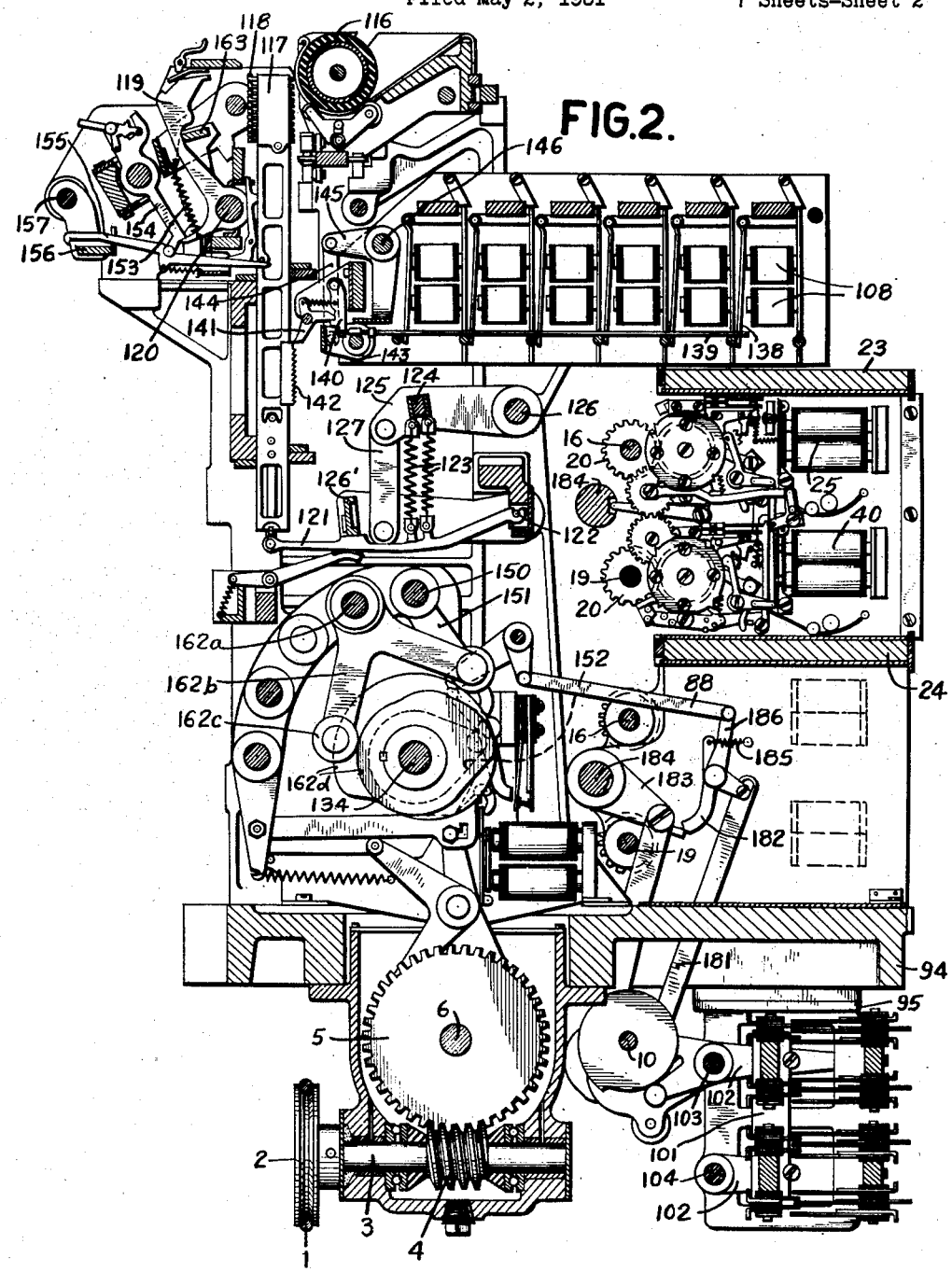
Fig. 2 is a similar view, the parts being shown in section to show the interior of the machine including the printing mechanism and one of the duplex accumulator units.

As shown in Fig. 2 the machine is driven from an electric motor or other power source through a belt 1 mounted on a pulley 2 fixed on a shaft 3 having a worm 4 meshing with a worm wheel 5 on shaft 6. In Fig. 1 the shaft 6 is shown as having a gear 7 mounted thereon and meshing with the gear 8 which in turn meshes with a gear 9 on a shaft 10. Also mounted on this shaft is a bevelled pinion 11 meshing with a bevelled pinion 12 on a vertical shaft 13. Fixed on shaft 13 is a bevelled pinion 14 meshing with a bevelled pinion 15 fixed on a shaft 16 (Fig. 2) which reaches across the back of the machine. Also fixed on shaft 13 is another bevelled pinion 17 meshing with a bevelled pinion 18 fixed on shaft 19 (Fig. 2) which also reaches across the machine parallel to the shaft 16. Both the shafts 16 and 19 have fixed thereon a number of gears 20 (see Fig. 4). Each related pair of accumulator units is mounted on a plate 21 and is provided with a pair of gears 22 (Fig. 8). The units may be slid into position between upper and lower supporting plates 23 and 24 as shown in Fig. 2. When in this position the gears 22 mesh with one of the driving gears 20. When the machine is in operation the shaft 6 and also the shafts 16 and 19 are constantly turning. Thus the gear 22 of each accumulator unit will also rotate constantly.

*The duplex accumulator*

As shown in Fig. 4 two accumulators are mounted on a common plate 21. The upper accumulator is normally set with its wheels at zero and is adapted to receive and add credit entries and at the same time, through gear connections, rotate the lower set of wheels in a reverse direction. The lower accumulator is normally set with its wheels at nine and is adapted to receive and add debit entries, simultaneously rotating the upper set of wheels in a reverse direction. Since the accumulators are similar in construction a description of one applies as well to the other.

In the present Hollerith system the passage of the card under the sensing brushes is synchronized with the movement of the other mechanism so as to produce the proper differential action in accumulating and printing when an impulse is released under control of the card.

Whenever an electrical impulse is initiated it may be sent through a corresponding counter magnet 25 (Figs. 2, 4, 5, and 11) in order that the accumulator may be actuated to properly enter the amount therein. The energization of magnet 25 (Fig. 4) attracts an armature 26, moving it to the right thereby unlatching arm 27 of an assembly, mounted for oscillation on stud 28, the assembly being normally urged counterclockwise by spring 29. Therefore, when armature 26 releases arm 27 the assembly is rotated slightly counterclockwise. This assembly includes a pair of upwardly extending parallel arms 30 and 31 (not shown) in the upper ends of which is fixed a horizontal rod 32. On rod 32 there is mounted for rotation a sleeve 33 on which are fastened pinions 34 (Fig. 8) and 35. Pinion 35 is adapted to mesh with a gear 36 (see lower accumulator, Fig. 4) loose on stud 37, and pinion 34 is alined to mesh with a gear 38 (Fig. 8) so that whenever the assembly on which the pinions are mounted is carried to the left (Fig. 4) the gears 36 and 38 will be connected for rotation. Gear 38 is fast on a sleeve 39 which is loose on stud 37. Alongside of gear 38 and rotating with it is the gear 22 (Fig. 8) in mesh with gear 20 (Figs. 2 and 4) which we have seen is in constant rotation in timed relation with the card feed being mounted on the constantly running shaft 16.

With the above construction in mind the differential action of the accumulator may be understood. When credit counter magnet 25 or debit counter magnet 40 is energized at a time determined by the position of a perforation on the card, the related armature 26 releases an arm 27 permitting it to rock until arm 31 rests against a stop. This movement engages pinions 34 and 35 with the related gears 38 and 36 and causes gear 36 to rotate in synchronism with gear 38. This rotation continues until a projection 41 on a cam 43 secured to sleeve 39 passes under finger 42 projecting from the upper end of arm 31, thereby rocking the pinion assembly clockwise, disengaging the pinions from the gears and permitting armature 26 to latch arm 27. There are two projections on cam 43, for the cam is timed to turn a half revolution for each accumulating cycle. Pinion 35 is provided with a detent 44 to engage and locate the same when the pinions are moved out of engagement with the gears. To positively restore armature 26 a member 45 is provided having a projection abutting the right side of the armature 26 and a horizontal arm under arm 27 so that when arm 27 is restored the member 45 will be rocked counterclockwise to draw the armature away from the magnet if the spring 461 has not already done so.

The pinions 34, 35 and gears 36, 38 are formed with teeth resembling ratchet teeth. The sides of the teeth which enter into driving engagement with each other are cut with a minimum pressure angle so that as a pinion is rocked into engagement with a gear, the tendency to throw the gear out again is not present as would be the case if gears having involute teeth were employed.

The means for connecting the two accumulators for reverse rotation will now be taken up. The upper and lower accumulator wheels on the plate 21 are parts of separate accumulators, the upper wheel being in the credit accumulator, and the lower wheel being in the debit accumulator. Both wheels are in the same denominational order. Turning to Fig. 8 it is noted that alongside of gear 36 on each of the accumulator wheels is a gear 46. It is apparent that gear 46 is on the part of the accumulator unit which is differentially moved by pinion 35 when the pinion is rotated by the constantly revolving gear 38. In mesh with gear 46 on the upper accumulator wheel is a gear 47 (Figs. 4 and 8) mounted for rotation on a stud 48 projecting from a bracket 49 secured to the side of plate 21. In mesh with gear 47 is another gear 50 also mounted on bracket 49 with a stud 51. The gear 50 is in mesh with gear 46 on the lower accumulator wheel.

Thus the two accumulator wheels in a related order of the debit and credit counters are connected by gearing so that the movement of one will be transmitted to the other. Both the upper and the lower wheels are adapted to rotate in a counterclockwise direction when adding a received credit or debit item, however, only one item is added at a time so that the acccumulator not receiving the item additively may have its wheels rotated in a clockwise direction. If a credit card passes through the machine, magnet 25 is energized at the proper time and the upper accumulator wheel is rotated in the normal additive counterclockwise direction, while the lower wheel, by means of gears 47 and 50, will be rotated in a subtractive clockwise direction. The first three lines of numerals in Fig. 9 illustrate such a problem, the item being a credit of 86. It will be noted by observing the first line of numerals in Figs. 9 and 10 that the credit wheels normally stand at zero and the debit wheels then stand at nine. If a debit card passes through the machine, certain of the circuits are changed so that magnet 40 instead of magnet 25 is energized at the proper time, and the lower accumulator wheel is rotated in the normal additive counterclockwise direction while the upper wheel, by means of gears 47 and 50, will be rotated in a subtractive clockwise direction. The third, fourth and fifth lines of numerals in Fig. 9 illustrate such an operation, the item being a debit of 72. If a transfer movement is imparted to one of the wheels receiving the item entered, this movement also will be transmitted through gears 47 and 50 to turn the connected wheel a unit in the subtractive direction.

From Figs. 9 and 10 it is noted that a credit item is added to the number on the wheels of upper credit accumulator and subtracted from the numerals on the lower debit accumulator. A debit item is added to the number on the wheels of the lower debit accumulator and subtracted from the number on the upper credit accumulator. In this way either one of the accumulators will contain the balance as a true number while the other accumulator will hold the nines complement of the balance.

A common detenting device is provided for positioning and alining both of the credit and debit accumulator wheels in a denominational order when the driving pinions 35 are disengaged from the gear 36. Normally arms 30 are latched by armatures 26 in a position wherein both driving pinions are disengaged from the accumulator wheels. At this time, therefore it is advisable to hold the wheels from rotation until one of the arms 30 is rocked to enter an amount. For this purpose a train of connections including a link 52 (Fig. 4) is provided. This link has pin and slot connections 53 with both arms 27. The slots are so arranged that the rocking of either assembly 30 to mesh pinion 35 will lift the link without disturbing the other pinion assembly. A pin 54 in link 52 engages a slot in the end of one arm of a bell crank 55 pivoted on a stud 56. When the link is lifted the bell crank is rocked in a clockwise direction its vertical arm 57 pulling a horizontal detent link 58, pinned at 59, to the right (Fig. 4). The detent link at its left end has a slot 60 which enables the link to move freely back and forth on stud 48 at the same time being held in place on the unit by a headed screw in the stud. A single toothed detent member 61 is riveted to link 58 in a position where it normally is inserted between two teeth on the gear 47, thus holding this gear from rotation and since both the upper and lower accumulator wheels are connected by gearing with gear 47 they also are held in position and alined by detent 61. The bell crank 55 is in the form of a bail and has another horizontal arm 62 to which is attached one end of a spring 63 urging it in a counterclockwise direction. This spring serves to normally hold detent 61 in engagement with gear 47, however, when either assembly 39 is rocked to mesh pinion 35, link 52 is lifted, crank 55 is rocked, and detent 61 is withdrawn from the teeth of gear 47 so that both accumulator wheels may be rotated. The spring clips 64 shown on many of the members in Fig. 4 are provided for the purpose of aiding in the assemblage and removal of parts. They are made of spring material and are secured at one end to a member while at the other end they are offset and carry a short pin which is part of a linkage.

Carrying mechanisms

For effecting carrying or transferring from one order to the next higher order a brush 65 (Figs. 4 and 7) fixed to an arm 66 pivoted at 67 is adapted to cooperate with a segment 68 on a disk 69 mounted on stud 37 and fixed with respect to constantly rotating gears 22 and 38. When an accumulator wheel 36—46 (Fig. 8) of a given order passes from its nine position to its zero position, a projection 70 (see Figs. 6 and 7) on disk 71 fixed with respect to the gear 46 will engage a projection on the arm 72 and rock the arm into the position of Fig. 7. The latching pawl 73 will then cooperate with a projection 74 (see Fig. 7) on the arm 66 and latch the arm in this position so that the brush 65 will be in position to make contact with the commutator segment 68 when the latter, which is constantly rotating, passes the brush.

This contacting of brush 65 with segment 68 will take place soon after the projection 41 associated with the accumulator wheel of the next higher order has engaged the arm 42 and cammed the gear 35 out of mesh with gear 36. The contacting of brush 65 with segment 68 will supply current through disk 69, to the contact brush 75 touching commutator 69 during the transferring, and then to the magnet 25 or 40 of the adding unit of the next higher order. Gear 35 will reengage and turn gear 36 one more step and then be cammed out by cam point 415. If the value standing in the wheel of any accumulator unit happens to be nine when one is added to that order causing the adding wheel to pass from the nine position to the zero position, it will be necessary to continue the carrying on to the accumulator unit of the next higher order. In order that this may be effected when the wheel 46 of any order stands at the nine position, its disk 71 will present a depression 76 to the arm 72 as in Fig. 6, permitting the arm to be rocked counterclockwise by its spring 77 into the position of Fig. 6 rocking the brush 78 also carried by the arm 66 into position to be engaged by a commutator segment 79 also on the disk 69.

The brushes 65 and 78 are insulated from each other and current is supplied to them through separate wires but both brushes are adapted to carry current to the disk 69 and through the contact brush 75 to the counter magnet 25 or 40 of the next higher order. The segment 68 engages the brush 65 at the same time that the segment 79 is adapted to engage its brush 78. Thus if the accumulator wheel of a given order passes to zero position and supplies current to the brush of the accumulator unit of the next higher order, if the latter unit contains the value nine it, besides being caused to accumulate an additional one by reason of the position of the brush 65 in the unit of the next lower order, will supply current through its brush 78 to the unit of the next higher order to carry one thereto.

Of course, if the cam disk 71 of a given order is standing in its nine position, as in Fig. 6, as soon as one is added to this order, the cam disk 71 will turn one more step to the position of Fig. 7. This will rock the brush arm 66 to the position shown in Fig. 7 but current will already have been supplied through brush 78 to perform the carrying function in the next order. The rocking of the arm 66 to this position to cause the brush 65 to be engaged by its commutator segment 68 will have taken place too late to effect the carry in the next higher order. It is for this reason that the brush 78 is provided. The rocking of the brush 65 to this position thus has no effect and it will be restored to normal position before the next segment 68 reaches it. After the brush arm 66 has been rocked to the position of Fig. 7 and latched by the pawl 73 and after the segment 68 has passed the brush 65, the arm 66 is released by a projection 80 engaging the inner projection 81 of the latching pawl arm 73 which is pivoted at 82, rocking the pawl against the action of its spring 83 and releasing the arm 66 to permit its spring 77 to rock it counterclockwise until the projection 72 engages the periphery 84 of the disk 71. The arm 66 will then be in such a position that neither brush 65 or brush 78 will make contact with the disk 69.

Although both the upper and the lower accumulator are provided with carrying mechanisms, only the carrying devices in the accumulator receiving the item are effective during an operation of the machine. The other carrying devices associated with the accumulator being driven in a reverse direction by the transmission gears 47 and 50, may trip mechanically but they are disabled by breaking the circuit through the transfer devices in a manner to be described further on in this description in connection with the wiring diagram. Of course, the transfer movements imparted to the accumulator receiving the item entry will be transmitted in a reverse direction to the other accumulator just as the differential movements under control of a record card are transmitted.

When the machine is conditioned for subtraction, transfers from the highest order wheel in an accumulator are communicated to the lowest order wheel in order to supply the elusive or fugitive one. This is done to supply the unit required when an accumulator holding a balance in the form of nines complements of the balance, has added to it a number large enough to place the true balance as a natural number on that accumulator. For example, in the illustration given in Fig. 10, the first five lines under "lower"; the accumulator wheels are standing at 9999 and a debit item of 86 is added to the wheels, this results in the wheels being rotated to 0085, or one short of the true balance; to supply the needed unit the transfer produced when the highest order wheel went from nine to zero is added in the units order. The result, 0086 is the true debit balance. In the same way, should the upper wheels contain a nines complement and a credit item large enough be added, the transfer from the highest order wheel, produced when it goes from nine to zero, will be added on the lowest order wheel to supply the unit lost when the change was made from a nines complement to a true number.

Printing mechanisms

The printing mechanism which is shown in greater detail in my copending application Serial No. 442,348, includes a platen 116 (Fig. 2) and a type carrier 117 having a plurality of type elements 118 adapted to be struck by a hammer 119 loose on a rod 120. The type carrier is connected at its lower end to an arm 121 fulcrumed at 122. Springs 123 connected to the arm 121 and to a cross beam 124 connected between arms 125 pivoted at 126 tend to raise the arm 121 to raise the type carriers. A restoring bail 126' connected by links 127 to arms 125 is adapted to restore the arms 121 to their lower or normal position. An arm 128 (Fig. 1) fixed to the shaft 126 on which the arms 125 are also fixed is connected by a link 129 to a complementary cam follower arm 130 pivoted at 131 and cooperating with cams 132 and 133 on cam shaft 134. Shaft 134 is driven through a chain of gears 135, 136, and 137 the latter of which is mounted on shaft 6. The shaft 134 turns synchronously with the feeding of the cards through the machine and the bail 126' (Fig. 2) is thus raised so as to permit the type carrier to rise synchronously with the feeding of the card. Thus when the type element 118 carrying the numeral nine is approaching the printing line with respect to platen 116 and the actuating hammer 119, the nine position on the card will be passing the reading brushes 90.

If there is a hole at the nine position, a circuit will be closed through the brush 90 to the printing magnet 108 (Fig. 2) of that particular column. This will attract the armature 138 actuating a rod 139 which is connected to a latching member 140. This will release the latching pawl 141 permitting it to cooperate with the ratchet teeth 142 carried by the type carrier to stop the type carrier with the nine type in line for printing. When the arms 125 raise the bail 126' to permit the type carriers to rise, the springs 123 will be stretched so as to raise the arm 121 of the type carrier. After printing has been effected, the arms 125 are then lowered with the bail 126' to restore the type carriers to normal position.

The latching pawls 141 must then be restored before the type bars begin their next upward movement. For this purpose a bail 143 is adapted, when rocked clockwise, to rock the latching pawl 141 counterclockwise against the action of its spring and permit it to be latched by the latch 140. The bail 143, is connected by links 144 to arms 145 fixed on shaft 146 on which is also fixed an arm 147 (Fig. 1) connected by link 148 to an arm 149 pivoted at 150 and connected to a cam follower arm 151 (Fig. 2) adapted to be actuated by a cam 152 on shaft 134.

The several type actuating hammers 119 are actuated by individual springs 153 tending to rock them against the type 118 to effect printing. The hammers are normally locked in their inoperative position by individual latches 154. These latches are connected to arm 155 adapted to be moved to the left by a bar 156 when the rising of the particular type carrier 117 permits the arm 155 to rock counterclockwise into a position to be actuated by the bar 156.

The bar or bail 156 is pivoted at 157 and is connected to an arm 158 (Fig. 1) connected by a link 159 to a bell crank 160 in turn connected by a link 161 to an arm 162 fixed at 162a to a shaft which carries (see Fig. 2) a cam follower arm 162b having rollers 162c cooperating with complementary cams 162d mounted on shaft 134. The bail 163 which restores the hammers to normal position is fixed on the shaft 120 with the arm 160 (Fig. 1). The pin and slot connection between link 159 and arm 158 permits the shaft 120 to turn clockwise far enough to move the bail 163 out of the way of the hammers 119 before the arm 158 and bail 156 are actuated to release the hammers.

Where listing is to be effected on the listing sheet 168 as in Fig. 12 while the data is also being accumulated, the printing magnet 108 will be connected to receive an impulse through the perforation in the card simultaneously with the transmission of such impulse to the accumulator magnet 25 or magnet 40. The amount may be listed whether the item is a debit or a credit. As shown in Fig. 12 a plus or minus sign may be printed adjacent the item to classify it as a debit or a credit. The sign printing mechanism is not shown in this application but a complete disclosure of this mechanism is given in my copending application Serial No. 426,582.

Total taking devices

When a total is to be taken of a group of items which have been accumulated, it is necessary to open certain listing circuits and close certain total printing circuits. The mechanism for effecting these circuit changes is shown in Fig. 3 in which a magnet TSM is adapted to be energized whenever a total is to be taken. Suspended from base 94 is a pair of brackets 95 supporting a series of contacts arranged in tiers for compactness, each of which comprises an upper blade 96, a center blade 97 and a lower blade 98. Cooperating with these fixed blades are blades 99 and 100 mounted for vertical movement on end bars 101 supported by arms 102 secured to shafts 103 and 104 journalled in brackets 95. A spring 105 (Fig. 1) attached to an arm 106 on one end of shaft 103 tends to urge bars 101 downwardly from their normal, or listing position, wherein the blades 96 and 99 are in contact with each other.

At the other end of shaft 103 arm 102 carries a link 107 which forms a toggle connection with a link 165 pivoted at 169. This toggle connection is held with its common connecting point slightly to the left of dead center, as shown in Fig. 3, by the action of spring 105. An adjustable stop 170 limits the movement of the parts to the left. Energization of magnet TSM attracts its armature 171 rocking it about its pivot 172 to unlatch a hammer 173 which under action of spring 174 strikes the toggle at its connecting point and moves it sufficiently to the right of dead center to allow spring 105 (Fig. 1) to further move the parts to total position.

A double armed lever 179 secured to shaft 103 and having a roller 181a moves to engage its cam 180 on continually running shaft 10 immediately upon breakage of toggle 107, 165 permitting a link 181 to rock a latch 182 against spring 185 and out of engagement with the toe of an arm 183 fast to a rock shaft 184. Link 181 also, through bell crank 186 actuates link 88 (Fig. 2) to cause additional paper spacing in a manner fully described in my copending application Serial No. 442,348. The aforementioned hammer tripping takes place at a time when cam 175 secured to continually running shaft 10 is about to present its descending portion 176 to a roller 177 mounted on an arm 178 loosely pivoted on shaft 103. As roller 177 follows the periphery 176 of cam 175 it permits shaft 184 to rock clockwise (in Fig. 3) through a link 187 attached to arm 183 since latch 182 is now out of cooperation therewith. Continued rotation of shaft 10 causes cam 188 to cooperate with a bell crank lever 189 loose upon shaft 103 and held against cam 188 by spring 190. At such a time cam 180 has restored shaft 103 to almost normal position from which roller 191 moves toggle 107, 165 across dead center and against stop 170. A roller 192 strikes finger 193 integral with hammer 173 to restore the same.

In Fig. 1 shaft 184 has connection to a similar shaft 184 through link 194 and arms 195 so that both shafts operate together. These shafts extend across the accumulating sections of the machine and have a groove 196 cooperating with the ends 197 of levers 198 (see Figs. 4 and 5) pivoted at 198a on the accumulator unit plates 21. At the right end of lever 198 is a link 199 having pin and slot connection 200 (Fig. 5) with the lever. With the parts in the position shown in Fig. 4 link 199 is held in its raised position. But during totaling with shaft 184 rocked the link 199 is lowered as seen in Fig. 5.

Resting in slots 201, in link 199 are pins 202 in the free ends of horizontal arms 203 pivoted at 204. Also on the free ends of arms 203 are fulcrum blocks 205 in contact with the underside of spring 29. When the parts of the accumulator are in normal position for item entering as in Fig. 4 arm 203 is held in raised position by lever 198 and vertical link 199. Underneath a projection 2051 on arm 203 but normally out of contact therewith is a latch 206 on the lower end of arm 207 pivoted at 208. Integral with arm 207 is an upwardly extending arm 209 (Fig. 5) having its free end in the path of cams 210 fast to gears 36, 46 (see Fig. 8).

While arm 203 is in the normal position the free end of spring 29 is pressed upwardly by fulcrum 205 and serves, as already explained, to swing the assembly 30, in counterclockwise direction to carry out the adding operation. With the parts in totaling position the arm 203 is held in raised position by the engagement of its lateral projection 2051 with latch 206. So that when arm 209 is raised by cam 210, latch 206 is withdrawn from underneath lever 203 which thereupon drops sufficiently to release pressure of fulcrum 205 on spring 29 which then follows the fulcrum downwardly and rotates the assembly 30 clockwise instead of counterclockwise.

In other words, spring 29 tends to rotate the assembly 30 in one direction when fulcrum 205 is elevated and in the other direction when the fulcrum is lowered. This by reason of the fact that with fulcrum 205 released, spring 29 bears upon arm 211 of lever 27 on assembly 30 with greater turning effort than is exerted, in the opposite direction by the end 212 of spring 29 at the point where the spring fits in a slot in lever 27. This action, as will be shown, takes place to clear the counter wheel after total printing.

A totaling cam 213 (Fig. 5) is provided with four raised cam portions 214. This cam is fast to transfer cam 71 and gear 46 as may be seen in Fig. 8. The cam therefore has four zero positions. Cooperating with cam 213 is a bell crank 215 pivoted at 216 and having the lower end 409 of the vertical arm projecting into the path of the raised portions 214 on cam 213. The shape of the end 409 and portion 214 allows movement of the accumulator wheel in either direction. The other arm of crank 215 has fastened to it an insulating block 410 cooperating with the underside of a contact spring 411. This contact 411, and an upper contact 412 insulated from it, are part of a circuit closed during a totaling operation. The cam 213 is adapted to move bell crank 213 in a counterclockwise direction, lifting contact 411 and closing points TC, see Fig. 11. The bell crank is so placed that when the accumulator wheel stands at zero the projecting end of the vertical crank arm stands on one of the raised portions 214 and contact points TC are closed. In Fig. 11 it may be seen that a series of contacts TC cooperate with wheels 213 in the upper credit accumulator, and another series of contacts TC cooperate with wheels 213 in the lower debit accumulator.

The totaling contacts BI (Fig. 11) are provided for the purpose of testing whether the total to be printed is a negative or positive balance. These contacts BI are similar in construction and operation to the contacts TC, the only difference being that contacts BI are in a different circuit and the accumulator wheel with which they cooperate is the highest order wheel in the debit accumulator. These contacts are used for controlling the printing of a total where the amounts added and subtracted yield a negative balance. That is, where the sum of the various amounts subtracted is greater than the sum of the various amounts added in the machine.

Where the total is a positive total, the highest order wheel in the credit accumulator will contain a zero and the wheel cooperating with contacts BI will contain a nine, therefore contacts BI will remain open as shown in Fig. 11, and the circuits leading from the upper contacts TC to the printing magnets 108 will remain closed so that a total representing a positive balance will be printed under control of the credit accumulator. Where the total is a negative total, the highest order wheel in the credit accumulator will contain a nine and the highest order debit accumulator wheel cooperating with contacts BI will contain a zero, therefore contacts BI will be closed thus energizing a minus balance magnet MBM (Fig. 11) which shifts certain total control contacts so that the lower contacts TC are connected to the printing magnets 108 and a total representing a negative balance will be printed under control of the debit accumulator. The circuit through magnet MBM leads from the one side of the line 230, through wire 250, contacts TS1 now closed, cam contact CR6, wire 251, contacts BI, wire 252, magnet MBM, wire 253, wire 254, wire 255, and wire 256 to the opposite side of the line 240. When magnet MBM is thus energized it acts to move contact blade 257 so that contact MBB is closed and contact MBC is opened. The other contacts affected by the magnet MBM are adjusted so that the impulses, sent through the accumulator magnets 25 or 40 to initiate the totaling operation, as explained further on, are directed to the proper accumulator. For this reason contact blade 235 is moved by magnet MBM so that contact MBD is closed and contact MBE is opened, thus initiating the totaling operation in the debit rather than the credit accumulator.

When it is desired to take a total, magnet TSM is energized to rock shafts 184 and also shift the contacts described in connection with Fig. 3. Referring now to Fig. 11 contacts TS4 and TS5 are also closed at this time, one of their blades being fixedly mounted, and the other movable having such relationship as blades 96 and 100 already described.

A pair of make and break cam contacts CR4 and CR5 are arranged to operate to transmit an impulse through the total taking or cancelling circuit at an instant corresponding substantially one point in advance of the 9 position on a card. These cams are mounted on a continually operating shaft driven by gear connections to the continually running shaft 10. On the shaft are also cam contacts CR2 and CR3 to be described presently.

With contact blades 96, 97, 98, 99, 100 shifted from the position of Fig. 3, contacts CR4 and CR5 function to send an impulse through the accumulator in advance of 9 card position, current flowing from right of line 230, wire 231, wire 232, through contact TS4 now closed, contacts CR4, CR5, line 233, bus bar 234, contacts TSD now closed, the blade 235, through either MBE or MBD according to whether the total is a minus or plus balance, through wire 236 or 237, magnets 25 or 40, bus bar 238, wire 239, and back to the other side of the line as represented by wire 240.

This energization of magnets 25 or 40 engages all the credit or debit counter wheels for rotation which were not already standing at zero position. For it is to be observed that with cams 210 and 213 at "0" the parts are positioned as shown in Fig. 5 with arm 203 dropped so that fulcrum 205 rests upon arm 211. Obviously when magnet 25 is now energized arm 30 will not turn counter-clockwise to drive the register wheel.

During the rotation of the counter wheels the type bars are rising in synchronism with the movement of the register wheels, which in this case may be considered to be the cams 213. The motion of each type bar is arrested by an impulse through its printer magnet 108, through a circuit from right side of line 230, wire 231, to contact TS5 now closed, cam contacts CR2 and CR3, wire 241 or wire 242 depending on whether the total is a minus or plus balance, bar 243 or bar 244, upper or lower contacts TC, cable 245 or 246, to contacts MBC or MBB selectively closed in a manner described hereinbefore, cable 247, to contact TSC now closed, to printer magnet 108, bus bar 248, wire 249 to opposite side of line 240.

Thus, such counter wheels which represent a significant figure will rotate with one of their cam surfaces 214 approaching bell crank 215, to close contact TC and to send an impulse exactly as a perforation in a card column closes a circuit to a printer magnet. Simultaneous with the arrival of cam 214 at zero position, cam 210 rocks arm 209 clockwise to throw the counter driving elements out of operative engagement, leaving the counter wheel in a reset or zero position, in a manner already described in connection with Fig. 5.

Machine operating connections

The wiring diagram of Fig. 11 shows the control of the machine for effecting adding, subtracting, printing, card feeding and totaling. The control of the machine is more fully disclosed in my copending application, Serial No. 442,348. Only so much of the control as is necessary to understand the operation of the present device is included in this diagram as the complete control wiring diagram would be so much more complicated that it would not be so readily understood without an unnecessary amount of study.

The source of power is at PS and includes the lines 230, 240. When a switch at PS is closed the operating motor of the machine is energized and will operate connected parts to which the various mechanisms in the machine may be clutched.

When the start key 260 is depressed contacts K1, K2 will be closed. This will close a circuit from the line 230, through conductor 261, contacts K2, wire 262, card feed clutch magnet CFM, wire 263, contacts K1 now closed, wire 264, stop key contacts K3 normally closed, wire 255, 256 to the line 240. The energization of magnet CFM will cause operation of the card feed mechanism to feed cards through the machine. This magnet also controls the contacts CFC1, closing them when the magnet is energized. As the cards commence feeding through the machine they will depress the upper card lever UCL, closing contacts 265, 266 and opening contacts 267. The start key 260 may then be released and the circuit through the magnet CFM will be maintained from line 230, through wire 261, wire 268, contacts 266, contacts 265, wire 269, wire 262, magnet CFM, wire 263 contacts CFC1, wire 264, contacts K3, wires 255, 256 to line 240.

Between the passage of the cards the card lever UCL is released so that contacts 265, 266 open and contacts 267 become closed. During this interval the CF1 cam permits its contacts to be closed so that the current will flow around the contacts 265, 266 at this time and thus continue the circuit. While the cards are holding the contacts 265, 266 closed the CF1 contacts are held open by their cam. If cards fail to feed the circuit will be broken, deenergizing the card feed clutch magnet and thus stopping the card feed mechanism.

If printing is to be effected under control of the cards being fed through the machine the switch S4 will be closed so that when the start key 260 is depressed a circuit will also be established through the printing clutch magnet PCM. This circuit is as follows: from the line 230, through wire 270, printing clutch magnet PCM, through switch S4, contacts LCL1 as soon as the LCL card lever is closed by the cards that are now being fed through the machine, contacts K1, wire 264 contacts K3, wires 255, 256 to line 240.

The energization of magnet PCM causes the printing operating devices to be clutched to the main operating mechanism so that type bars 117 and associated mechanism are operated. After the start key is released the circuit continues through the contacts CFC1. If cards fail to feed the LCL card lever will permit its contacts to open, breaking the circuit through the magnet PCM. The stoppage of the card feed mechanism by deenergization of magnet CFM also causes opening of the contacts CFC1 so that the circuit is broken at two points. When the total key is pressed to take a total, contacts TS6 will close to reenergize the printer clutch magnet PCM through wire 274 so that the total may be printed.

While the machine is in operation and cards are being fed the machine may be stopped at any time by depression of the stop key 271 to open the contacts K3. This will break the circuit through the card feed clutch magnet and the printing clutch magnet. The operating motor will, of course, continue to operate until the switch at PS is opened.

A platen feed mechanism is provided to feed the record paper before printing in both listing and total operations. A platen feed magnet PFM, when energized acts to clutch the platen spacer to the driving mechanism. The circuit through the platen feed magnet is as follows: line 230, wire 272, magnet PFM, contacts PM3 closed before printing, and wire 273 to the other line 240.

A number of circuit closing contacts shown in Fig. 11 are operated by certain parts of the machine depending upon whether the contacts are to be operated during a card feeding cycle or during a totaling cycle of the machine when feeding is not being effected. The contacts and cams that are operated during the card feeding cycle of the machine when the machine is either adding or subtracting, during which operation listing of the amounts added and subtracted may also be effected, are designated CF cams and contacts. All of the CF cams may be mounted on the shaft 275 of Fig. 1 which shaft is operated when cards are being fed through the machine.

Other cams and contacts are designated as CR cams and contacts. These cams are continuously operating whether the machine is adding and subtracting or totaling. These cams may be mounted for operation on shaft 10 (Fig. 2) which shaft is always turning. Certain contacts not operated by cams and designated TS contacts may be normally opened or normally closed and are controlled by plates 101, Figs. 1, 2 and 3. When the machine goes into a totaling operation magnet TSM is energized to shift the parts so that the open TS contacts become closed and those that are closed become opened. The contacts designated SB are adapted to be opened or closed when the subtraction magnet SBM is energized. The contacts designated MB are adapted to be affected when the minus balance magnet MBM is energized.

*Accumulating and listing*

When cards are fed through the machine they first pass under the upper brushes 276 at UB (Fig. 11) and then under the lower brushes 90 at LB. While a card is under the brushes 90 contacts CF3 are closed by their cam. If a perforation appears in any column on the card, when such perforation passes under a brush 90 a circuit will be set up through the perforation as follows if the card is a credit card: from line 230, through the LCL2 contacts which are held closed by the cards while cards are feeding, through contacts CF3 and through the brush 277 to the common contact 278, then through the perforation in the card to the brush 90, to plug socket J1, through a plugging wire to the socket J3, to contacts 279 now closed, through cable 280, through contacts SBF, wire 281, through magnet 25, to bus bar 238, and through wire 239 to the other side of the line 240.

The energization of magnet 25 as we have seen in connection with Figs. 4 and 5 causes the accumulator gear 46 to commence to turn in accumulating. It commences to turn at a point in the cycle when a perforation passes under the brush 90 and ceases to rotate when the cam point 41 (Fig. 4) causes the gear 35 to become disengaged from gear 36. Thus the amount represented by the position of the perforation is added in the upper credit wheel and, through gearing 47, 50, subtracted from the lower debit wheel.

The circuit through the brush 90 also effects printing through the following circuit: from the plug socket J3 through contacts TSA closed during listing, wire 282, through printing magnet 108, to bus bar 248 and through wire 249 to the other side of the line 240. The energization of printing magnet 108 as described in connection with Fig. 2 controls the setting of the type carrier 117 to cause printing of the character represented by the position of the hole in the card.

Carrying from one order on an accumulator to the next higher order is effected as follows: If the credit accumulator wheel of any order passes from nine to zero during an adding operation it will cause the brush 65 to rock into position to be later engaged by the segment 68 on commutator 69 as has been described. After the accumulator wheel has been disengaged the contacts CF2 are closed momentarily. This closure takes place at the moment when the commutator segment is passing the position of brush 65. If the brush has been rocked so as to be engaged by the segment, a circuit will be closed at this moment from the line 230, through wire 283, contacts CF2, contacts SBA closed during credit item entering, bus bar 284, brush 65, commutator 69, brush 75, wire 285, magnet 25 of the next higher order, bus bar 238, and through wire 239 to the other side of the line 240. As soon as a one has been rolled into the wheels, the cam point 415 (Fig. 4) will cam the pinion 35 out again so that the accumulator wheel again stops after having received an additional one. If any accumulator wheel is standing at nine when an additional one is added to it, we have seen that its brush 78 (Fig. 11) will be in position to be engaged by segment 79 on commutator 69. This engagement also takes place during the moment that contacts CF2 are closed. Thus when current passes from the brush 75 to wire 285 it will also pass on to brush 78, through commutator 69 of the next higher order, then to brush 75 of that order and out to the next wire 286 and on to the adding magnet 25 of the order above to cause one to be added to such order. Thus if the accumulator wheel of the tens order is standing at nine at the end of an accumulating operation and the wheel of the units order passes from nine to zero, one will be carried into the accumulator wheel of the tens order and through the brush 78 of the tens order into accumulator wheel of the hundreds order, and so on.

If while accumulating in either counter, the highest order wheel goes from nine to zero, a unit is lost in passing from the nines complement of an amount to the true balance supposed to be held by the wheels. To restore this unit to the accumulator, the transfer or carry from the highest order wheel is transmitted to the units order wheel which is then turned one step as in a carrying operation. For this purpose there is provided in the credit accumulator a wire 298 which runs from the brush 75 in the highest order through switch S6 closed during subtraction, and to wire 299 leading to the magnet 25 of the units order accumulator wheel. So also in the debit accumulator a wire 300 leads from the highest order carrying devices to the lowest order magnet.

If the card carries a debit amount one of its columns will be perforated with a hole in a position above the amount perforation positions. The brush 287 in the upper brushes (Fig. 11) which reads this particular column is connected by the plug line 288 to the subtraction magnet SBM which serves to set the devices so that the number on the card is added on the lower or debit accumulator shown in Fig. 4. Thus if there is a perforation in this position, brush 287 will make contact with the common contact roller 289 and set up a circuit from the line 230, through wires 261, 268, contacts 266 now closed, wire 290, subtracting magnet SBM, contacts CF5 closed while the brushes are passing the extra perforation, plug J6, plug wire 288, brush 287, contact roller 289, brush 291, wire 292 and back to the line 240. The energization of magnet SBM serves to open the contacts SBA, SBF, and close the contacts SBB, SBE. These contacts will remain in their changed position while the card is passing under the lower brushes 90. The changed relation of the SB contacts directs the accumulating and carrying impulses through the lower or debit accumulator and opens the circuits through the upper or credit accumulator which is then driven in a reverse direction by gearing 47, 50 as explained hereinbefore.

When the debit card is passing through the lower brushes the amount readings sensed by brushes 90 will be transmitted the same as credit amounts through plug socket J3 and through cable 280, but since contacts SBF are opened and contacts SBE are closed by magnet SBM, the impulses will be directed through magnets 40, through bus bar 238 and wire 239 to the other side of the line 240. The carry circuit is changed so that the circuit is closed through the brushes 65 in the debit accumulator by closing contacts SBB, and the credit accumulator brushes are disabled electrically by breaking the circuit through the upper carrying devices at SBA. If the units wheel in the debit accumulator passes from nine to zero, brush 65 will contact commutator 69 and a circuit will be established from line 230, wire 283, contacts CF2, contacts SBB, bus bar 293, brush 65, commutator 69, brush 75, wire 294, magnet 40 in the tens order, bus bar 238, and wire 239 to the other side of the line 240. If the tens order wheel should have been standing at nine, brush 78 would be contacting commutator 69 and a circuit would be established through wire 295 to the magnet 40 in the hundreds order. The printing of the debit amount is performed by energization of magnet 108 by impulses transmitted over the same circuits used in listing credit amounts.

*Totaling operation*

To take a total, the total key 296 is depressed closing contacts K4, Fig. 11. This energizes magnet TSM as soon as the CR1 contacts are closed. The circuit is from line 230, through wire 261, wire 268, contacts 267, contacts K4, magnet TSM, contacts CR1, wire 297, wires 254, 255, 256, to the other side of the line 240. The contact blades 99 and 100 are then shifted by the mechanism shown in Fig. 3.

Contacts CR4 and CR5 are closed at a definite time after the shifting of contact blades 99, 100, and a circuit will be set up from the line 230 through wires 231, 232, contacts TS4 now closed, contacts CR4 and CR5, wire 233, contacts TSD now closed, contacts MBE (if a credit balance), magnet 25, bus bar 238, wire 239 and back to the line 240. This takes place, as explained before, at a time in the operation of the machine corresponding to one step prior to the time that the nine positions on the card would pass under the brushes 90. The credit accumulator wheels are then all thrown into mesh for operation and will turn through ten steps or in other words each wheel will turn to add the value ten unless interrupted at an intermediate point. While the accumulator wheels are thus turning, a circuit is also closed from the line 230 through wire 231, contacts TS5 now closed, contacts CR2 and CR3, wire 241, bus bar 243 to upper contact TC. The cams 213 are turning with the accumulator wheels. When a raised portion on cam 213 closes contact TC the circuit will continue through cable 245, contacts MBC, cable 247, contacts TSC, wire 282, printer magnet 108, bus bar 248, wire 249 to line 240. The energization of magnets 108 will set the respective type bars for printing the total of the balance which was standing on the credit accumulator wheels. The accumulator wheels will be demeshed at the zero position, the grooved bar 184 of Figs. 3 and 4 having released the lever 198 to permit the gears 35 to be cammed and latched out so that the accumulators will be cleared and ready for a new accumulating operation.

In another application I disclose how the number which is taken out of the accumulators may be returned thereto so that after a total has been printed it will still remain in the accumulators and additional data may be added thereto to produce an accumulative total. This is effected by locking the bar 184 against rotation so that the accumulators will not be demeshed at the zero position but will continue to turn until they have turned a distance equal to the value ten and will thus have returned to their starting position.

As explained hereinbefore, if the amount standing in the accumulators is a minus balance, the credit accumulator will contain a nines complement and the debit accumulator will contain a true number as a balance. The accumulator wheel of the highest order in the credit accumulator will contain a nine and the corresponding debit wheel will stand at zero. Whenever a total is to be taken, the wheel 213 of the highest order in the debit accumulator is analyzed for a zero. If it contains a zero, devices are set up to print the total under control of the debit accumulator instead of the credit accumulator. After the total key 296 has been depressed and the contacts TS1 closed, current will pass from line 230 through wire 250, contacts TS1, contacts CR6 now closed, wire 251, contacts B1, wire 252, magnet MBM, wires 253, 254, 255 and 256 to line 240. This magnet MBM opens contacts MBE, MBC and closes contacts MBD and MBB. The circuit to start the accumulator wheels turning in totaling will then be from line 230 through wires 231, 232, contacts TS4, contacts CR4 and CR5, wire 233, contacts TSD, contacts MBD, wire 237, magnet 40, bus bar 238 and wire 239 to line 240. This will cause the debit accumulator wheels to commence to rotate. They will rotate until they reach their zero positions at which time they will be demeshed and left at zero for a new accumulating operation. The circuit to the printer magnets 108 will be established on debit balance printing operations, from line 230 through wire 231, contact TS5, contacts CR2 and CR3, wire 242, bus bar 244, contacts TC, cable 246, contacts MBB, cable 247, contacts TSC, wire 282, printer magnet 108, bus bar 248 and wire 249 to the other side of the line 240.

In order to print an asterisk as a total identifying sign, devices are provided including an extra type bar holding the special type and a magnet 405 for controlling the type bar. This magnet will be energized by a circuit from line 230 through wires 231, 232, contacts TS4, contacts CR4 and CR5, wire 406, plug socket J7, plug wire to socket J8, magnet 405, bus bar 248 and wire 249 to the line 240.

Since the basic novel features of the invention have been shown and described as applied to a single modification, it will be understood that various omissions and substitutions and changes in the form and details of the device illustrated and changes in its operation may be made by those skilled in the art without departing from the spirit of the invention. It is the intention therefore, to be limited only as indicated by the scope of the following claims:

I claim:

1. In an accounting machine of the class described, a pair of accumulators each comprising a plurality of accumulating wheels, a plurality of accumulating gears, one fixed to each accumulator wheel, two sets of constantly rotating driving gears mounted adjacent said accumulating gears, two sets of pinions adapted to be moved at predetermined times for connecting and disconnecting said driving gears and said accumulating gears for rotating either set of accumulator wheels in addition, and other gear connections between the accumulating gears on wheels of similar orders in the separate accumulators, the arrangement being such that the set of wheels being rotated in addition will drive the other set of wheels an equal extent in a direction which is the reverse of the normal adding movement of the other wheels.

2. In a perforated record controlled machine, means for analyzing the records placed in the machine, a credit accumulator with its wheels normally at zero, a debit accumulator with its wheels normally at nine, item entering means under control of said analyzing means for adding credit items to the credit accumulator and debit items to the debit accumulator, gear connections between the accumulators enabling either accumulator when adding an item to the number standing on its wheels to rotate the other accumulator in a reverse direction subtracting the item from the complement of the number standing on the other accumulator wheels, means cooperating with the highest order wheel in the debit accumulator to detect the presence of a zero on that wheel, and means under control of said detecting means, for printing a debit balance under control of the debit accumulator wheels if the highest order wheel stands at zero, or printing a credit balance under control of the credit accumulator wheels if the highest order debit wheel does not stand at zero.

3. In an accumulating mechanism, an accumulator wheel, means for rotating the wheel in either direction in adding and subtracting numbers, a total reading device in constant cooperation with said wheel and operated when the wheel approaches the zero position in either direction, and means under control of said device for printing the number registered by said wheel when it is rotated in a certain direction during total taking.

4. In an accumulating mechanism, an accumulator wheel, means for rotating the wheel in either direction, means adapted to print a number representing the extent of movement of said wheel, a circuit for controlling said printing means, contacts for closing said circuit, a cam attached to said wheel, a cam lever in constant cooperation with said cam to operate said contacts when operated by the cam as the wheel turns to the zero position in either direction, and means adapting said circuit to control the printing means when the wheel is rotated in a certain direction during total taking.

5. In a machine of the class described, a plurality of accumulators, means for operating the accumulators, means for selecting an accumulator for operation, gearing associated with all the accumulators, a detenting device cooperating with said gearing to hold the accumulators in adjusted position, and means for differentially releasing said device from said gearing at the instant any accumulator is selected for operation.

6. In a perforated record controlled machine, means for analyzing the records passing through the machine, a pair of accumulators, means for selecting one of the accumulators for operation, means for operating the selected accumulator under control of said analyzing means, gearing between the accumulators enabling the selected accumulator to drive the other accumulator, a detent engaging said gearing to prevent movement of the accumulators while they are not being operated, and means for disengaging said detent at the instant any perforation is sensed during the analyzing of a record.

7. In an accumulating device, a constantly running gear, a normally idle accumulating gear, a clutch for causing said driving gear to actuate said accumulating gear, said clutch comprising a pair of pinions constrained to turn together, said pinions being adapted to mesh with said gears, a detent for positioning the pinions when out of mesh with the gears, another detent for positioning the accumulating gear when it is idle, and an electromagnet adapted to control said pinions and said accumulating gear detent.

8. In an accumulating mechanism, a pair of accumulating wheels, gearing between said wheels, means for rotating said wheels in both directions, means adapted to print a number representing the extent of movement of either of said wheels, electrical devices for controlling said printing means including connections to both of said wheels, a pair of contacts for making said electrical connections effective, cams attached to said wheels, cam levers in constant cooperation with said cams and operated when the wheels approach zero in either direction of rotation to close said contacts, and means for selectively disabling one of said connections during the printing of a total.

9. In a machine of the class described, two sets of accumulator wheels, gears for connecting the wheels of all similar denominational orders, means for actuating said wheels, means for selecting one set of wheels for actuation, separate detenting devices one for each denominational order and each cooperating with a gear between the wheels of an order to hold the wheels in adjusted position, and means for actuating said devices individually when a related order wheel of either set is conditioned for actuation.

10. In a perforated record controlled machine, an accumulator wheel, means for actuating said wheel, gearing in mesh with said wheel, a detent adapted to engage said gearing to hold said wheel in position, an electromagnet which is energized under control of the perforated record, and means under control of said electromagnet for operating said detent to release said wheel.

11. In a record controlling machine, means for sensing amounts on the records, devices for sensing whether said amounts are positive or negative, an accumulating mechanism under joint control of said sensing means and sensing devices for adding and subtracting the amounts in computing positive and negative balances, means including electric contact devices operated by said mechanism for reading positive and negative balances on the accumulating mechanism, a single set of type bars, electromagnetic means under control of said item sensing means and said balance reading contact devices for adjusting said bars to represent positive and negative items and balances, and means for taking impressions off said bars to print true numbers representing positive and negative items and balances in a single column on a record sheet.

12. In a record controlled machine, means for sensing credit and debit amounts on said records, a set of credit accumulating elements and a set of debit accumulating elements connected for movement in opposite directions, means under control of said sensing means for operating either set of accumulating elements to add the amounts represented on the records and simultaneously subtract in the other set, total printing devices, means for controlling said operating means to operate said credit elements as in adding to read a positive balance therein during the taking of a total, means for detecting the presence of a negative balance and controlling said operating means to move said debit elements as in adding in reading a negative balance, and electrical devices under control of said accumulating elements to operate said total printing devices to record a positive balance when the credit elements are moved as in adding and a negative balance when the debit elements are moved as in adding.

JOHN ROYDEN PEIRCE.